(12) United States Patent
Kato

(10) Patent No.: US 10,505,239 B2
(45) Date of Patent: Dec. 10, 2019

(54) BATTERY PACK

(71) Applicant: TOYOTA JIDOSHA KABUSHIKI KAISHA, Toyota-shi, Aichi (JP)

(72) Inventor: Masaki Kato, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 104 days.

(21) Appl. No.: 15/704,358

(22) Filed: Sep. 14, 2017

(65) Prior Publication Data

US 2018/0083327 A1     Mar. 22, 2018

(30) Foreign Application Priority Data

Sep. 16, 2016  (JP) ................. 2016-182412

(51) Int. Cl.
*H01M 2/10*        (2006.01)
*H01M 4/62*        (2006.01)
*H01M 10/653*      (2014.01)

(52) U.S. Cl.
CPC ....... *H01M 10/653* (2015.04); *H01M 2/1016* (2013.01); *H01M 4/62* (2013.01)

(58) Field of Classification Search
CPC .......... H01M 2/10; H01M 2/02; H01M 10/04; H01M 10/617
See application file for complete search history.

(56) References Cited

U.S. PATENT DOCUMENTS

| 2009/0047575 | A1  | 2/2009  | Abe et al. |
| 2009/0098458 | A1* | 4/2009  | Fujii ................. H01M 4/02 429/209 |
| 2010/0159314 | A1  | 6/2010  | Kim et al. |
| 2010/0279161 | A1* | 11/2010 | Kang ................. H01M 6/46 429/94 |
| 2011/0159341 | A1* | 6/2011  | Iwamoto ........... H01M 2/1094 429/120 |
| 2015/0072205 | A1  | 3/2015  | Jung et al. |

(Continued)

FOREIGN PATENT DOCUMENTS

| CN | 101501895 A | 8/2009 |
| CN | 104350633 A | 2/2015 |

(Continued)

*Primary Examiner* — Kenneth J Douyette
(74) *Attorney, Agent, or Firm* — Sughrue Mion, PLLC

(57) ABSTRACT

Provided is a battery pack having a plurality of single cells connected to one another, the battery pack being capable of preventing a temperature elevation caused by a short-circuit current that is generated when a sharp conductive foreign matter penetrates each of the single cells. In the battery pack disclosed herein, the single cells are arranged alternately adjacent to one another, and these adjacent single cells are electrically connected in series, and layered electrode bodies of these single cells have the following configurations. Among positive electrode sheets and negative electrode sheets, a negative electrode sheet is disposed on the uppermost stream side, and an endothermic agent is disposed as a layer between this negative electrode sheet and a positive electrode sheet. A negative electrode sheet is disposed on the lowermost stream side, and an endothermic agent is disposed as a layer between this negative electrode sheet and an inner surface of a battery case.

6 Claims, 4 Drawing Sheets

(56) References Cited

U.S. PATENT DOCUMENTS

| | | | |
|---|---|---|---|
| 2015/0171411 A1* | 6/2015 | Kobayashi | H01M 2/22 429/61 |
| 2016/0181606 A1 | 6/2016 | Suga et al. | |
| 2016/0233474 A1 | 8/2016 | Kagami et al. | |
| 2017/0222280 A1 | 8/2017 | Asano et al. | |

FOREIGN PATENT DOCUMENTS

| | | |
|---|---|---|
| CN | 105594054 A | 5/2016 |
| JP | 2003-31187 A | 1/2003 |
| JP | 2007-335294 A | 12/2007 |
| JP | 2009-64767 A | 3/2009 |
| JP | 2009-266402 A | 11/2009 |
| JP | 2016-119154 A | 6/2016 |
| WO | 2016/051639 A1 | 4/2016 |

\* cited by examiner

BATTERY PACK

BACKGROUND OF THE INVENTION

1. Field of the Invention

The present invention relates to a battery pack. More specifically, the present invention relates to a battery pack having, as single cells, a plurality of secondary cells connected to one another. This application claims priority to Japanese Patent Application No. 2016-182412, filed on Sep. 16, 2016, the entire contents of which are hereby incorporated by reference into the present application.

2. Description of the Related Art

Battery packs in which, as single cells, a plurality of secondary cells such as lithium-ion secondary cells and nickel-hydrogen cells or power storage elements such as capacitors are connected in series or in parallel by bus bars, have become increasingly important as the in-car power sources or the power sources for personal computers, portable terminals and the like. Particularly, due to their light weights and high-energy densities, the battery packs having lithium-ion secondary cells as single cells have favorably been used in the in-car high-output power sources and the like.

The lithium-ion secondary cells used as the single cells are each generally configured by storing an electrode body with sheet-shaped positive and negative electrodes in a battery case. In recent years, in order to improve battery performance, there has been developed the lithium-ion secondary cell with a layered electrode body in which rectangular positive and negative electrode sheets are layered.

A battery pack having a plurality of such lithium-ion secondary cells connected to one another is required to provide a high level of safety, not to mention excellent battery performance. For example, in some cases when single cells produce heat during use, the single cells add heat to one another, increasing the temperature of the entire battery pack. In this case, materials inside the single cells become denatured by heat, possibly ruining the physical or chemical stability thereof.

In order to keep the stability by preventing the increase in the temperatures of the cells, countermeasures such as the ones described in Japanese Patent Application Laid-open No. 2003-31187 and Japanese Patent Application Laid-open No. 2009-266402 have been proposed. Japanese Patent Application Laid-open No. 2003-31187, for example, describes a secondary cell and a battery pack with a plurality of the secondary cells in which an endothermic agent composed of a compound capable of conducting an endothermic reaction is added to an envelope film or an enveloping pack material of the secondary cell and the battery pack, in order to inhibit a temperature increase that can occur upon abnormal heat production of the cells.

SUMMARY OF THE INVENTION

However, in constructing a battery pack by connecting in series a plurality of single cells having layered electrode bodies, positioning the endothermic agent as described in above literature often could not inhibit a temperature increase of each single cell. For example, when a mobile object such as a vehicle is mounted with the foregoing battery pack and moved, a sharp conductive foreign matter such as a nail can puncture into the battery pack from the front in the moving direction. When such conductive foreign matter penetrates each of the single cells, short circuit occurs in each single cell and consequently an electric current flows rapidly to the conductive foreign matter, generating Joule heat. This might drastically increase the internal temperature of each single cell.

Specifically, when a sharp conductive foreign matter F punctures into a battery pack 100 having the structure shown in FIG. 4 and penetrates each of single cells 110A, 110B, a short-circuit current E1 flows from a positive electrode sheet 132 toward a negative electrode sheet 134 through this conductive foreign matter F. In such a case, Joule heating (resistive heating) of the short-circuit current E1 flowing through the conductive foreign matter F raises the internal temperatures of the single cells 110A, 110B.

Moreover, when the conductive foreign matter F penetrates both of the single cells 110A, 110B, sometimes a short-circuit current E2 is generated between the plurality of single cells 110A, 110B through bus bars 140. Specifically, when the conductive foreign matter F penetrates both of the single cells 110A, 110B, a conductive path is created by the positive electrode sheet 132 of the single cell 110B, the bus bars 140, the negative electrode sheet 134 of the single cell 110A, and the conductive foreign matter F. As a result, the short-circuit current E2 of approximately 700 A flows from the positive electrode sheet 132 of the downstream-side single cell 110B toward the negative electrode sheet 134 of the upstream-side single cell 110A. And then when this short-circuit current E2 flows through the conductive foreign matter F, Joule heating of this current raises the temperature of the downstream-side single cell 110B considerably. In a battery pack in which two or more single cells are connected to one another, this temperature elevation by the short-circuit current E2 occurs in all of the second and subsequent single cells.

The present invention was contrived in view of the foregoing circumstances, and a main object of the present invention is to provide a battery pack having a plurality of single cells connected to one another, the battery pack being designed to prevent a temperature elevation that is caused by a short-circuit current between the plurality of single cells when a sharp conductive foreign matter penetrates each of the single cells.

A battery pack disclosed herein is a battery pack that has a plurality of single cells of an identical shape arranged adjacent to each other, the adjacent single cells having positive and negative electrode terminals electrically connected alternately in series. Among the plurality of arranged single cells, the single cell located at one end of the arrangement direction has the positive electrode terminal serving as a positive electrode output terminal that is opened so as to be connectable to the outside, and the single cell located at the other end of the arrangement direction has the negative electrode terminal serving as a negative electrode output terminal that is opened so as to be connectable to the outside.

Each of the single cells of the battery pack disclosed herein has a layered electrode body in which a plurality of rectangular positive and negative electrode sheets are layered alternately with separators therebetween, and a square battery case corresponding to the layered electrode body, the direction of layering of the positive and negative electrodes configuring the layered electrode body being the same as the arrangement direction of the plurality of single cells.

In the following description, the single cell that has the positive electrode output terminal and is located at one end is "a first single cell", and the single cell that has the negative electrode output terminal and is located at the other end is "an n-th single cell". In addition, the side in the arrangement direction where the first single cell is located corresponds to an upstream side, whereas the side where the n-th single cell is located corresponds to a downstream side.

In the battery pack disclosed herein, the layered electrode body of each of the single cells from the first single cell to at least an (n−1)-th single cell has both of the following configurations (1) and (2).

(1) Among the plurality of positive and negative electrode sheets that configure the layered electrode body, a negative electrode sheet is disposed on an uppermost stream side in the arrangement direction (i.e., the uppermost stream side in the layering direction), and an endothermic agent is disposed as a layer between this negative electrode sheet and a positive electrode sheet adjacent thereto on the downstream side.

(2) Among the plurality of positive and negative electrode sheets that configure the layered electrode body, a negative electrode sheet is disposed on a lowermost stream side in the arrangement direction (i.e., the lowermost stream side in the layering direction), and an endothermic agent is disposed as a layer between this negative electrode sheet and an inner surface of the battery case that faces this negative electrode sheet on the downstream side.

Next is described a situation where a sharp conductive foreign matter punctures the battery pack of the foregoing structure from the upstream side toward the downstream side in the arrangement direction (i.e., from the first single cell to the n-th single cell) and then penetrates each of the single cells.

As described above, when a conductive foreign matter penetrates each of the single cells configuring a battery pack, a short-circuit current flows, through the bus bars, from the positive electrode sheets of the single cells arranged on the downstream side toward the negative electrode sheets of the single cells arranged on the upstream side. In a conventional battery pack, Joule heating that is caused by the short-circuit current flowing through the conductive foreign matter raises the temperatures of the single cells arranged on the downstream side.

In the battery pack disclosed herein, on the other hand, the endothermic agent that is disposed between the negative electrode sheet on the uppermost stream side and the positive electrode sheet adjacent thereto on the downstream side can absorb, at an early stage, the Joule heat generated by the short-circuit current flowing to the negative electrode sheet on the uppermost stream side. Furthermore, the endothermic agent disposed between the negative electrode sheet on the lowermost stream side and the battery case can absorb, at an early stage, the Joule heat generated by the short-circuit current flowing to the negative electrode sheet on the lowermost stream side.

As described above, in the battery pack disclosed herein, in a case where a short-circuit current flows from the single cell on the downstream side to the single cell on the upstream side through the bus bars, the Joule heat generated by this short-circuit current can be absorbed by the endothermic agent at an early stage. Therefore, the temperature elevation in each of the single cells configuring the battery pack can be inhibited.

According to a preferred aspect of the battery pack disclosed herein, a plurality of negative electrode sheets are disposed between the negative electrode sheet on the uppermost stream side and the negative electrode sheet on the lowermost stream side, and endothermic agents are disposed as layers adjacent to the plurality of negative electrode sheets on the downstream side.

Therefore, even when a short-circuit current flows into the negative electrode sheets disposed between the negative electrode sheet on the uppermost stream side and the negative electrode sheet on the lowermost stream side, the Joule heat generated by this short-circuit current can be absorbed at an early stage.

According to another preferred aspect of the battery pack disclosed herein, an endothermic agent is disposed as a layer between the negative electrode sheet on the lowermost stream side and a positive electrode sheet adjacent thereto on the upstream side.

Accordingly, in a case where a short-circuit current is generated between the negative electrode sheet on the lowermost stream side and the positive electrode sheet disposed on the upstream side through a conductive foreign matter, the Joule heat generated by this short-circuit current can be absorbed at an early stage.

In the battery pack disclosed herein, it is preferred that the endothermic agents contain any of metal hydrate, metal hydroxide, sugars, and alcohols. It is also preferred that the endothermic agents contain any of aluminum hydroxide, zinc hydroxide, calcium sulfate, erythritol, xylitol, glucitol, and mannitol. It is also preferred that an endothermic energy amount of each of the endothermic agents be 1 kJ/g to 10,000 kJ/g.

By using the endothermic agents described above, the Joule heat generated by the short-circuit current can appropriately be absorbed.

DESCRIPTION OF THE PREFERRED EMBODIMENTS

A battery pack having, as single cells, a plurality of lithium-ion secondary cells connected to one another is now described hereinafter as an example of a battery pack according to an embodiment of the present invention. In the battery pack disclosed herein, the cells used as the single cells are not limited to the lithium-ion secondary cells; thus, for example, nickel-hydrogen cells and other cells having layered electrode bodies can be used. Note that, in the present specification, such an expression as "A to B" (A and B each represent a number) in a numerical value range means "equal to or greater than A, but equal to or less than B."

1. Battery Pack

Figure 1:
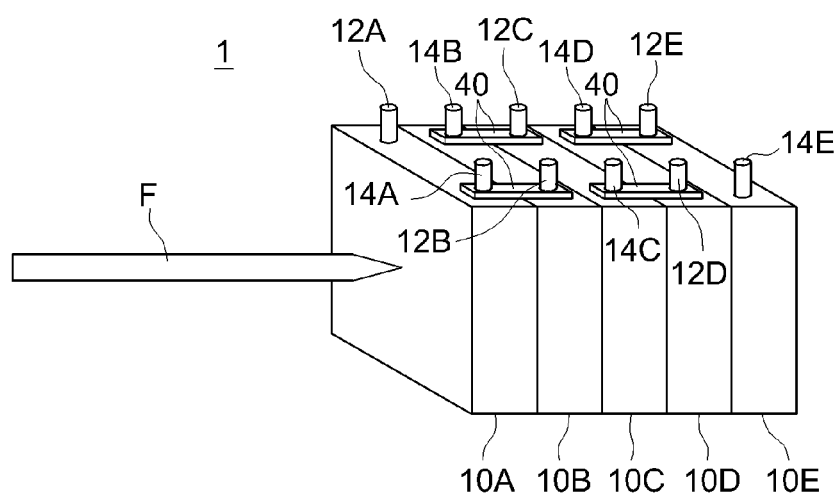
FIG. 1 is a perspective view schematically showing a battery pack according to an embodiment of the present invention and a conductive foreign matter.
Figure 2:
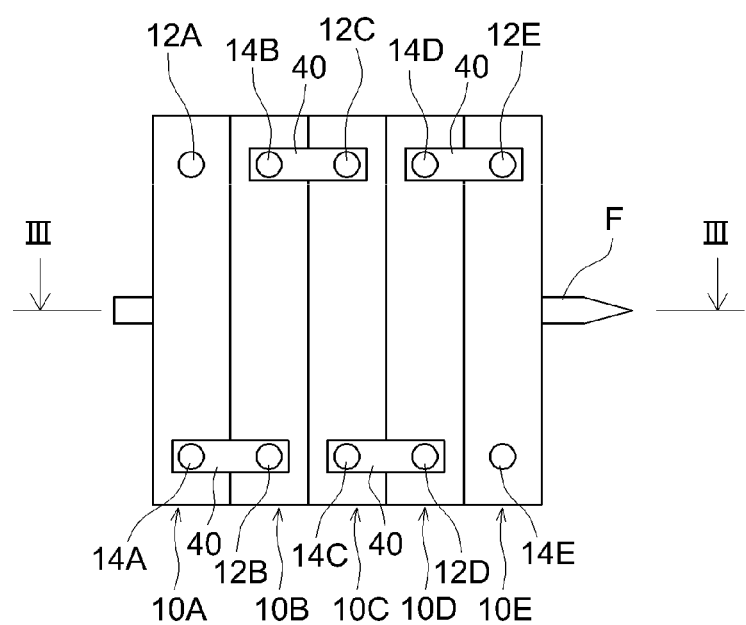
FIG. 2 is a plan view schematically showing the battery pack according to an embodiment of the present invention and a conductive foreign matter which puncturing the battery pack.
Figure 3:
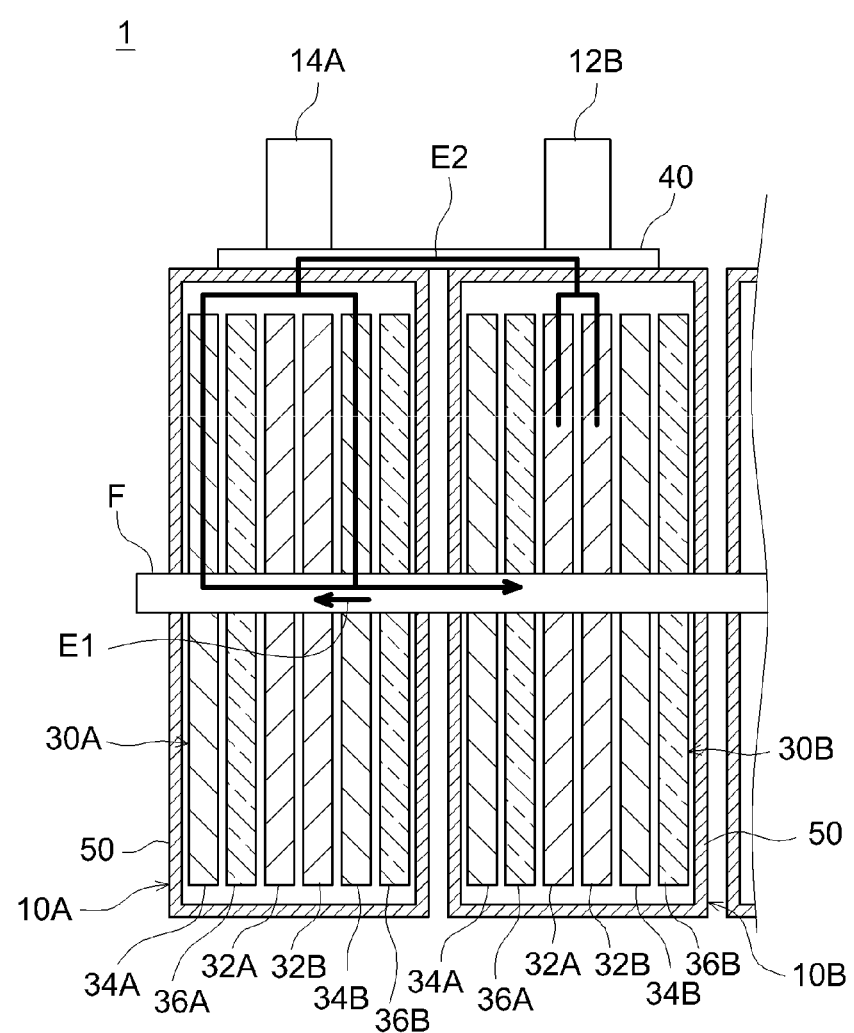
FIG. 3 is a cross-sectional view taken along the line III-III of the battery pack shown in FIG. 2, schematically showing the internal structure of the battery pack according to an embodiment of the present invention and a conductive foreign matter which puncturing the battery pack.
Figure 4:
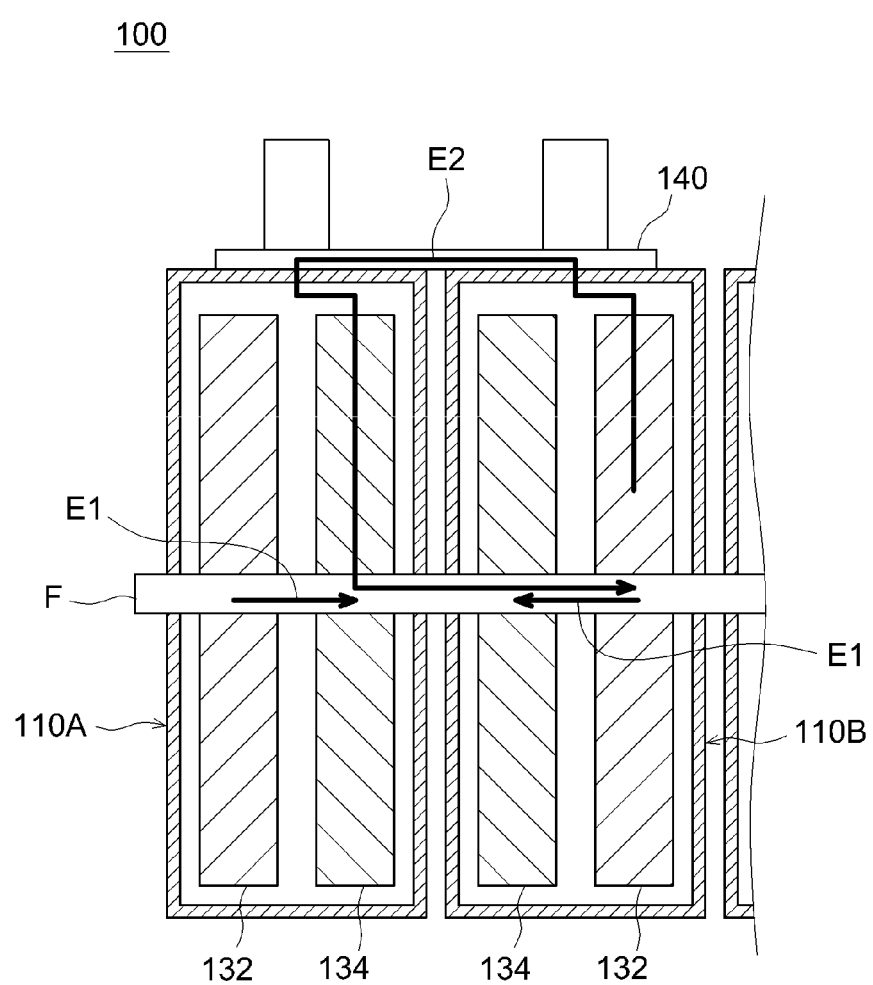
FIG. 4 is a cross-sectional view schematically showing the internal structure of a conventional battery pack and a conductive foreign matter which puncturing the battery pack.

FIGS. 1 and 2 are each a diagram schematically showing the battery pack according to the present embodiment and a conductive foreign matter, FIG. 1 being a perspective view and FIG. 2 a plan view. FIG. 3 is a cross-sectional view taken along the line III-III of the battery pack shown in FIG. 2, schematically showing the internal structure of the battery pack according to the present embodiment and a conductive foreign matter which puncturing the battery pack.

(1) Entire Configuration of the Battery Pack

As shown in FIGS. 1 and 2, a battery pack 1 according to the present embodiment has a configuration in which a plurality of single cells of an identical shape are arranged adjacent to each other, wherein positive and negative electrode terminals between the adjacent single cells are electrically connected alternately in series. Specifically, the battery pack 1 according to the present embodiment is configured by five single cells 10A to 10E. The single cells 10A to 10E have positive electrode terminals 12A to 12E and negative electrode terminals 14A to 14E, respectively, wherein the electrode terminals are connected to one another by bus bars 40. The number of single cells configuring the battery pack is not particularly limited.

Among the five single cells 10A to 10E arranged in the battery pack, the single cell 10A disposed at one end of the arrangement direction has the positive electrode terminal 12A serving as a positive electrode output terminal that is opened so as to be connectable to the outside. The single cell 10E disposed at the other end of the arrangement direction has the negative electrode terminal 14E serving as a negative electrode output terminal that is opened so as to be connectable to the outside.

In the following description, the single cell with this positive electrode output terminal 12A is the first single cell 10A, and the single cell with the negative electrode output terminal 14E is the fifth single cell 10E. The first single cell 10A side corresponds to the upstream side in the arrangement direction, and the fifth single cell 10E side corresponds to the downstream side in the arrangement direction. In other words, in the following description, the left-hand side of FIGS. 1 to 3 is the upstream side, and the right-hand side the downstream side.

When installing the battery pack 1 according to the present embodiment in a mobile object such as a vehicle, the battery pack 1 is installed in such a manner that the upstream side (the first single cell 10A side) is disposed in the front side in the direction of travel of the mobile object. In other words, the battery pack 1 is disposed in such a manner that when a sharp conductive foreign matter F such as a nail punctures into the battery pack 1 while the mobile object installed with the battery pack 1 is moving, the sharp conductive foreign matter F punctures into the battery pack 1 from the upstream side toward the downstream side (from the first single cell 10A toward the fifth single cell 10E side) in the arrangement direction.

(2) Configuration of the Single Cells

Each of the single cells 10A to 10E configuring the battery pack 1 according to the present embodiment is described next.

As will be described hereinafter in detail, when the single cells 10A to 10E of the battery pack according to the present embodiment are connected, the positive and negative electrodes of the single cells in the odd-numbered columns (the first, third and fifth single cells) are layered in reverse order from the positive and negative electrodes of the single cells in the even-numbered columns (the second and fourth single cells), so that the positive and negative electrodes of all the single cells 10A to 10E are layered in the same order.

Hereinafter, the first single cell 10A is described as an example of a single cell of an odd-numbered column, and the second single cell 10B is described as an example of a single cell of an even-numbered column. As to FIG. 3, the descriptions of the third and subsequent single cells are omitted for the same reason.

As shown in FIG. 3, the single cells 10A, 10B have layered electrode bodies 30A, 30B in which a plurality of rectangular positive electrode sheets 32A, 32B and negative electrode sheets 34A, 34B are layered alternately with separators therebetween (not shown), and square battery cases 50 corresponding to the layered electrode bodies 30A, 30B respectively.

(a) Battery Case

The battery cases 50 are each configured with a flat, rectangular cuboid-shaped case main body with an opened upper surface and a lid body for closing the opened portion of the upper surface. Note that the battery cases 50 are not necessarily made of metal but may be made from resin or laminated film.

The lid body configuring the upper surface of each battery case 50 is provided with the positive electrode terminals 12A, 12B and negative electrode terminals 14A, 14B described above. The positive electrode terminals 12A, 12B are connected to the positive electrode sheets of the layered electrode bodies 30A, 30B, and the negative electrode terminals 14A, 14B are connected to the negative electrode sheets. Note that the positive electrode terminals 12A, 12B are preferably configured with, for example, aluminum, aluminum alloy or the like, and the negative electrode terminals 14A, 14B are preferably configured with copper, copper alloy or the like.

(b) Electrolyte

The battery cases 50 described above are filled with the layered electrode bodies 30A, 30B and a nonaqueous electrolyte (typically a liquid-type or polymer-type (gelled) nonaqueous electrolyte). Nonaqueous electrolytes same as those that have conventionally been used in lithium-ion secondary cells can be used with no particular limitation.

(c) Layered Electrode Bodies

Next, the layered electrode bodies 30A, 30B are explained concretely with reference to FIG. 3. The layered electrode bodies 30A, 30B are configured by layering the positive electrode sheets 32A, 32B, the negative electrode sheets 34A, 34B, and endothermic agents 36A, 36B. The battery pack 1 according to the present embodiment is configured in such a manner that the direction of layering of the positive and negative electrodes is the same as the arrangement direction of the single cells 10A to 10E.

After describing hereinafter the constituent materials of the positive electrode sheets 32A, 32B, the negative electrode sheets 34A, 34B, and the endothermic agents 36A, 36B, the structure of layering the layered electrode bodies 30A, 30B is described.

(c-1) Positive Electrode Sheets

The positive electrode sheets 32A, 32B are each configured by forming a positive electrode active material layer on the surface of a positive electrode current collector made of a rectangular piece of aluminum foil or the like. The positive electrode active material layer includes a positive electrode active material and other additives (such as conductive materials and binders).

A lithium-containing compound containing a lithium element and one or two or more types of transition metal elements (lithium transition metal compound oxide) can be used as this positive electrode active material. Examples of the lithium transition metal compound oxide include such as lithium-nickel compound oxide (e.g., $LiNiO_2$), lithium-cobalt compound oxide (e.g., $LiCoO_2$), lithium-manganese compound oxide (e.g., $LiMn_2O_4$). In addition, another examples of the lithium transition metal compound oxide include ternary lithium-cobalt-containing compound oxides such as lithium-nickel-cobalt-manganese compound oxide (e.g., $LiNi_{1/3}Co_{1/3}Mn_{1/3}O_2$).

The ones that have conventionally been used in this type of lithium-ion secondary cell can be used with no particular limitation as the other additives that can be contained in the positive electrode active material layers. For example, carbon materials such as carbon black and other carbon powder and carbon fibers can be added as the conductive materials. Polymer materials that dissolve in organic solvents, such as halogenated vinyl resins such as polyvinylidene fluoride (PVDF) and polyvinylidene chloride (PVDC), polyalkylene oxide such as polyethylene oxide (PEO), and the like, water-soluble polymer materials or water-dispersible polymer materials such as polytetrafluoroethylene (PTFE), carboxymethyl cellulose (CMC), and styrene-butadiene rubber (SBR), may be added as the binders.

(c-2) Negative Electrode Sheets

The negative electrode sheets 34A, 34B are each configured by forming a negative electrode active material layer containing a negative electrode active material on the surface of a negative electrode current collector made of a rectangular piece of copper foil or the like. The negative electrode active material layer includes a negative electrode active material and other additives.

The types of the negative electrode active material are not particularly limited, and therefore one type of material that can be used as the negative electrode active material of this type of secondary cell can be used alone or two or more types of such materials can be combined (mixed or made into a composite), for example. Preferred examples of this negative electrode active material include carbon materials such as graphite, non-graphitizable carbon (hard carbon), easily graphitizable carbon (soft carbon), carbon nanotubes, and a combination thereof. Use of a graphite material is particularly preferred. For example, a graphite material having its surface coated with amorphous carbon can favorably be employed.

Furthermore, as with the positive electrode active material layers described above, the one that have conventionally been used in this type of lithium-ion secondary cell can be used as the other additives of the negative electrode active material layers. The materials same as those of the positive electrode active material layers described above can be used as the binders. In addition, thickeners, dispersants and the like can appropriately be used as the other additives. Examples of the thickeners include carboxymethyl cellulose (CMC) and methyl cellulose (MC).

(c-3) Endothermic Agent

As described above, the layered electrode bodies 30A, 30B of the present embodiment have the endothermic agents 36A, 36B respectively. For example, endothermic agents that are each obtained by molding a compound, which is capable of conducting an endothermic reaction in a temperature range of 100° C. to 140° C. into a sheet, can be used as these endothermic agents 36A, 36B, the temperature range being the same temperature range as the temperatures at which cells start an exothermic reaction.

Examples of the compounds used as the endothermic agents 36A, 36B include inorganic endothermic agents including hydrates (calcium sulfate 2-hydrate: $CaSO_4.2H_2O$, aluminum oxide hydrate: $Al_2O_3.H_2O$), hydroxides (aluminum hydroxide: $Al(OH)_3$, zinc hydroxide: $Zn(OH)_2$, cobalt hydroxide: $Co(OH)_2$, calcium hydroxide: $Ca(OH)_2$, zirconium hydroxide: $ZrO(OH)_2$, nickel hydroxide: NiOH, and the like, and organic endothermic agents such as sugars and alcohols (e.g., erythritol, xylitol, glucitol, mannitol, etc.).

In addition, it is preferred that the endothermic energy amounts of these endothermic agents 36A, 36B be adjusted in accordance with the level of a short-circuit current that flows through the conductive foreign matter F. For example, when the short-circuit current flowing through the conductive foreign matter F is expected to be 700 A, the endothermic energy amounts of the endothermic agents 36A, 36B are preferably 1 kJ/g to 10,000 kJ/g. Therefore, the Joule heat generated by the short-circuit current can be absorbed appropriately by the endothermic agents 36A, 36B.

(c-4) Separators

Although the illustration is omitted in FIG. 3, the separators are disposed between the positive electrode sheet 32A and the negative electrode sheet 34A and between the positive electrode sheet 32B and the negative electrode sheet 34B. Separators that are used in typical lithium-ion secondary cells can be used as these separators (e.g., porous sheets (films) made of resins such as polyethylene (PE), polypropylene (PP), polyester, cellulose, and polyamide). For convenience of explanation, descriptions of the separators are omitted hereinafter.

(c-5) Layered Structure of the Layered Electrode Bodies

A layered structure of the layered electrode bodies 30A, 30B according to the present embodiment is described next. The battery pack 1 according to the present embodiment has the layered electrode bodies in which all of the first to fifth single cells 10A to 10E have the following configuration.

As shown in FIG. 3, the layered electrode bodies 30A, 30B according to the present embodiment are configured by sequential layering of the negative electrode sheet 34A on the uppermost stream side, the first endothermic agent 36A, the positive electrode sheet 32A on the upstream side, the positive electrode sheet 32B on the downstream side, the negative electrode sheet 34B on the lowermost stream side, and the second endothermic agent 36B, from the upstream side toward the downstream side in the arrangement direction of the single cells 10A, 10B (the direction of layering of the layered electrode bodies 30A, 30B).

In other words, in the layered electrode body 30A of the present embodiment, the negative electrode sheet 34A is disposed on the uppermost stream side in the arrangement direction, and the positive electrode sheet 32A on the upstream side that is adjacent to the negative electrode sheet 34A of the uppermost stream side is disposed on the downstream side of the negative electrode sheet 34A on the uppermost stream side.

In the present embodiment, the first endothermic agent 36A is disposed as a layer between the negative electrode sheet 34A on the uppermost stream side and the positive electrode sheet 32A on the upstream side.

In a case where the conductive foreign matter F penetrates each of the single cells 10A, 10B and consequently the short-circuit current E2 flows from the second single cell 10B to the negative electrode sheet 34A on the lowermost stream side of the first single cell 10A through the bus bars 40, the Joule heat generated by this short-circuit current E2 can be absorbed by the first endothermic agent 36A at an early stage.

Furthermore, in the layered electrode body 30A of the present embodiment, the negative electrode sheet 34B is disposed on the lowermost stream side in the arrangement direction, and the second endothermic agent 36B is disposed as a layer between the negative electrode sheet 34B on the lowermost stream side and the inner surface of the battery case 50 that faces the negative electrode sheet 34B on the lowermost stream side.

Therefore, in a case where the short-circuit current E2 flows to the negative electrode sheet 34B on the lowermost stream side of the first single cell 10A through the bus bars 40, the Joule heat generated by this short-circuit current E2 can be absorbed by the second endothermic agent 36B at an early stage.

In addition, this second endothermic agent 36B can also absorb the heat generated by the adjacent other single cell (the second single cell 10B in FIG. 3), preventing an increase of the internal temperature thereof caused by the heat of the other single cell.

In the third and subsequent single cells 10C to 10E as well in the battery pack 1 according to the present embodiment, layered electrode bodies in which the first endothermic agent 36A and the second endothermic agent 36B are disposed are located in the same positions as the single cells 10A, 10B. Therefore, in the third and subsequent single cells 10C to 10E as well, the Joule heat generated by the short-circuit current E2 flowing through the bus bars 40 can be absorbed at an early stage.

Thus, the present embodiment can provide a battery pack having a high level of safety that can not only appropriately prevent the elevation of the internal temperatures of the single cells 10A to 10E but also prevent the physical or chemical stability of the single cells 10A to 10E from being ruined due to denaturation of the internal materials thereof by heat.

In addition, the foregoing description is not intended to limit the endothermic agents provided in the layered electrode bodies to the first endothermic agent 36A and the second endothermic agent 36B. Therefore, an endothermic agent other than the first endothermic agent 36A and the second endothermic agent 36B may additionally be provided. For example, in a case where the positive electrode sheet 32B on the downstream side is disposed adjacent to the negative electrode sheet 34B on the lowermost stream side as shown in FIG. 3, an endothermic agent may be disposed between the negative electrode sheet 34B on the lowermost stream side and the positive electrode sheet 32B on the downstream side.

Accordingly, when the short-circuit current E1 generated due to an internal short circuit flows from the positive electrode sheet 32B on the downstream side toward the negative electrode sheet 34B on the lowermost stream side through the conductive foreign matter F, the Joule heat generated by this short-circuit current E1 can be absorbed at an early stage.

The foregoing embodiment is not intended to limit the number of positive electrode sheets and the number of negative electrode sheets. In a case where three or more positive and negative electrode sheets are layered in the battery pack disclosed herein, the positive electrode sheets or the negative electrode sheets are appropriately disposed between the negative electrode sheet on the uppermost stream side and the negative electrode sheet on the lowermost stream side. In this case, it is preferred that the endothermic agents be disposed as layers adjacent to the added negative electrode sheets on the downstream side. Therefore, even when a short-circuit current flowing through the bus bars flows into the added negative electrode sheets, the Joule heat generated by this short-circuit current can appropriately be absorbed.

Furthermore, in the battery pack 1 according to the foregoing embodiment, all of the single cells 10A to 10E configuring the battery pack 1 have the first endothermic agent and the second endothermic agent. However, the n-th single cell disposed at the lowermost stream side in the arrangement direction (the fifth single cell 10E in FIG. 1) does not have other single cells disposed on the downstream side and therefore does not have the short-circuit current E2 flow thereto through the bus bars. Therefore, the n-th single cell does not necessarily have the first endothermic agent 36A and the second endothermic agent 36B.

2. Method for Manufacturing Battery Pack

A method for manufacturing the battery pack 1 according to the present embodiment is described next.

The manufacturing method according to the present embodiment is the same as a conventional method for manufacturing a battery pack in terms of preparing a plurality of single cells and connecting the electrode terminals of these single cells using bus bars.

However, the difference with the conventional method for manufacturing a battery pack is that the manufacturing method according to the present embodiment prepares two types of single cells having different structures for the layered electrode bodies so that the first endothermic agent 36A and the second endothermic agent 36B are disposed in the positions where the Joule heat generated by the short-circuit current E2 flowing through the bus bars 40 can be absorbed at an early stage.

Specifically, in manufacturing the battery pack 1, because the positive electrode terminals 12A to 12E and the negative electrode terminals 14A to 14E are connected by the bus bars 40 as shown in FIG. 2, the single cells 10B, 10D in the even-numbered columns are turned 180°. Therefore, in order to match all the orders of layering for the positive and negative electrodes of all the connected single cells 10A to 10E as shown in FIG. 3, the manufacturing method according to the present embodiment prepares two types of single cells in which the orders of layering for the positive and negative electrodes of the single cells 10A, 10C, 10E in the odd-numbered columns and the single cells 10B, 10D in the even-numbered columns are reversed.

When preparing the single cells 10A, 10C, 10E of the odd-numbered columns, as shown in the first single cell 10A in FIG. 3, the manufacturing method according to the present embodiment prepares the layered electrode body 30A in which the negative electrode sheet 34A of the uppermost stream side, the first endothermic agent 36A, the positive electrode sheet 32A of the upstream side, the positive electrode sheet 32B of the downstream side, the negative electrode sheet 34B of the lowermost stream side, and the second endothermic agent 36B are layered in this order, and then stores this layered electrode body 30A in the corresponding battery case 50 along with the electrolyte.

On the other hand, when preparing the single cells 10B, 10D of the even-numbered columns shown in FIG. 1, the manufacturing method according to the present embodiment prepares the single cells in which the orders of layering for the positive and negative electrodes are the opposite of those in the single cells 10A, 10C, 10E of the odd-numbered columns described above. In other words, the manufacturing method according to the present embodiment prepares the layered electrode body 30B in which the second endothermic agent 36B, the negative electrode sheet 34B of the lowermost stream side, the positive electrode sheet 32B of the downstream side, the positive electrode sheet 32A of the upstream side, the first endothermic agent 36A, and the negative electrode sheet 34A of the uppermost stream side are layered in this order, and then stores this layered electrode body 30B in the corresponding battery case 50 along with the electrolyte.

Then, the single cells 10B, 10D in the even-numbered columns having the orders of layering for the positive and negative electrodes reversed, are turned 180°, and then the positive electrode terminals 12A to 12E and negative electrode terminals 14A to 14E of the single cells 10A to 10E are connected sequentially by the bus bars 40, thereby completing the manufacturing of the battery pack 1 in which all the single cells 10A to 10E have the negative electrode sheet 34A of the uppermost stream side, the first endothermic agent 36A, the positive electrode sheet 32A of the upstream side, the positive electrode sheet 32B of the downstream side, the negative electrode sheet 34B of the lowermost stream side, and the second endothermic agent 36B disposed in this order from the upstream side toward the downstream side in the arrangement direction.

Test Examples

Test examples according to the present invention are described hereinafter; however, the following test examples are not intended to limit the present invention.

A. First Test

1. Test Example 1 to Test Example 3

A positive electrode active material layer having a positive electrode active material ($LiNi_{1/3}C_{O1/3}Mn_{1/3}O_2$), a conductive material (acetylene black) and a binder (polyvinylidene fluoride) mixed at a mass ratio of 94:3:3 was formed on both surfaces of a positive electrode current collector (aluminum foil) to form a rectangular positive electrode sheet.

On the other hand, a negative electrode active material layer having a negative electrode active material (graphite), a thickener (carboxymethyl cellulose), and a binder (styrene-butadiene rubber) mixed at a mass ratio of 98:1:1 was formed on both surfaces of a negative electrode current collector (copper foil) to prepare a rectangular negative electrode sheet.

Then, two of the positive electrode sheets, two of the negative electrode sheets, and two of the endothermic agents (aluminum hydroxide: endothermic energy amount 1 kJ/g) were layered to prepare a layered electrode body. In so doing, the positions for disposing the endothermic agents were made different from one another among test example 1 to test example 3. Note that, in the present test examples, the layered electrode bodies were prepared in which the orders of layering for the positive and negative electrodes were reversed in the single cells in the even-numbered columns so that the orders in which the positive and negative electrodes are layered were the same among the single cells of the odd-numbered columns and the single cells of the even-numbered columns.

Next, lithium-ion secondary cells (single cells) were prepared by storing each of the layered electrode bodies prepared as described above in battery cases along with the electrolyte. Among the five single cells, the single cells disposed in the even-numbered columns were turned 180° and the positive and negative electrode terminals of each of the single cells were connected by bus bars, thereby preparing battery packs for test example 1 to test example 3 in which the endothermic agents are disposed in the positions shown in Table 1.

2. Evaluation Test

The following nail penetration test was conducted as an evaluation test for each of the battery packs prepared as described above.

Specifically, under a temperature environment of 25° C., the SOCs of the battery packs of test example 1 to test example 3 were adjusted to 80%. Next, two thermocouples were attached to the outer surface of each battery case, and, under the temperature environment of 25° C., an iron nail with a diameter of 6 mm and a tip sharpness of 30° was put at right angle into the vicinity of the center of the wide surface of each square battery case at a speed of 20 mm/sec, to penetrate all of the single cells configuring each battery pack. Changes in temperature of the single cells (cells) configuring the battery pack of each test example were measured. The highest temperatures of the battery packs of the respective test examples that were obtained during the measurement are shown in Table 1.

TABLE 1

| | Endothermic Agent | Position of endothermic agent in each single cell | Highest Temperature (° C.) | | |
|---|---|---|---|---|---|
| | | | First cell | Second and fourth cells | Third and fifth cells |
| Test Example 1 | First endothermic agent | Between inner surface of battery case and negative electrode sheet on uppermost stream side | 575 | 600 | 600 |
| | Second endothermic agent | Between inner surface of battery case and negative electrode sheet on lowermost stream side | | | |
| Test Example 2 | First endothermic agent | Between negative electrode sheet on uppermost stream side and positive electrode sheet on upstream side | 575 | 600 | 600 |
| | Second endothermic agent | Between negative electrode sheet on lowermost stream side and positive electrode sheet on downstream side | | | |
| Test Example 3 | First endothermic agent | Between negative electrode sheet on uppermost stream and positive electrode sheet on upstream side | 575 | 575 | 575 |
| | Second endothermic agent | Between inner surface of battery case and negative electrode sheet on lowermost stream side | | | |

3. Evaluation Results

As shown in Table 1, test example 1 and test example 2 indicate that the highest temperatures of the second cell and the subsequent cells in the nail penetration tests were higher than the highest temperature of the first cell. This is understood to be because a short-circuit current flowing through the bus bars flowed through the conductive foreign matter and Joule heating of this short-circuit current has heated up the second single cell and the subsequent single cells.

Test example 3, on the other hand, indicates that the highest temperatures remained the same (575° C.) in all single cells as a result of the nail penetration tests. This result confirms that, when a sharp conductive foreign matter such as a nail penetrates each of the single cells, the configuration of test example 3 in which the first endothermic agent is disposed between the negative electrode sheet on the uppermost stream side and the positive electrode sheet on the upstream side and the second endothermic agent is disposed between the negative electrode sheet on the lowermost stream side and the battery case, enables absorption of the Joule heat of the resultant short-circuit current at an early stage, preventing Joule heating of this short-circuit current from heating up the second single cells and the subsequent single cells.

B. Second Test

Next, an endothermic agent having the endothermic energy amount different from those of the foregoing test examples 1 to 3 was prepared, to prepare battery packs for test example 4 and test example 5, as shown in Table 2. Note that the positions for disposing the endothermic agent in test example 4 and test example 5 are set to be the same as that of test example 3.

Then, a nail penetration test was conducted under the same conditions as the foregoing first test. The evaluation results for test example 4 and test example 5 are shown in Table 2 along with the results for test example 3 of the foregoing first test.

TABLE 2

| | Endothermic energy amount of endothermic agent (kJ) | Highest Temperature (° C.) | |
|---|---|---|---|
| | | First Cell | Second to Fifth Cells |
| Test Example 3 | 1 | 575 | 575 |
| Test Example 4 | 0 | 575 | 660 |
| Test Example 5 | 0.5 | 575 | 620 |

As shown in Table 2, the results for test example 3 confirm that when the endothermic energy amount of the endothermic agent is 1 kJ/g, the Joule heat generated by the short-circuit current can appropriately be absorbed, thereby preventing the temperature elevation in each of the single cells.

What is claimed is:

1. A battery pack comprising a plurality of single cells of an identical shape arranged adjacent to each other, the adjacent single cells having positive and negative electrode terminals electrically connected alternately in series, wherein, among the plurality of arranged single cells, the single cell located at one end of the arrangement direction has the positive electrode terminal serving as a positive electrode output terminal that is opened so as to be connectable to an outside, and the single cell located at the other end of the arrangement direction has the negative electrode terminal serving as a negative electrode output terminal that is opened so as to be connectable to an outside, each of the single cells has a layered electrode body in which a plurality of rectangular positive and negative electrode sheets are layered alternately with separators therebetween, and a square battery case corresponding to the layered electrode body, the direction of layering of the positive and negative electrodes configuring the layered electrode body being the same as the arrangement direction of the plurality of single cells, when the single cell that has the positive electrode output terminal and is located at one end is a first single cell, and the single cell that has the negative electrode output terminal and is located at an other end is an n-th single cell, and a side in the arrangement direction where the first single cell is located corresponds to an upstream side, whereas a side where the n-th single cell is located corresponds to a downstream side, the layered electrode body of each of the single cells from the first single cell to at least an (n−1)-th single cell has both of the following configurations (1) and (2):

(1) among the plurality of positive and negative electrode sheets that configure the layered electrode body, a negative electrode sheet is disposed on an uppermost stream side in the arrangement direction, and an endothermic agent molded into a sheet is disposed as a layer between this negative electrode sheet and a positive electrode sheet adjacent thereto on the downstream side; and (2) among the plurality of positive and negative electrode sheets that configure the layered electrode body, a negative electrode sheet is disposed on a lowermost stream side in the arrangement direction, and an endothermic agent molded into a sheet is disposed as a layer between this negative electrode sheet and an inner surface of the battery case that faces this negative electrode sheet on the downstream side.

2. The battery pack according to claim 1, wherein a plurality of negative electrode sheets are disposed between the negative electrode sheet on the uppermost stream side and the negative electrode sheet on the lowermost stream side, and endothermic agents are disposed as layers adjacent to the plurality of negative electrode sheets on the downstream side.

3. The battery pack according to claim 1, wherein an endothermic agent is disposed as a layer between the negative electrode sheet on the lowermost stream side and a positive electrode sheet adjacent thereto on the upstream side.

4. The battery pack according to claim 1, wherein the endothermic agents contain any of metal hydrate, metal hydroxide, sugars, and alcohols.

5. The battery pack according to claim 4, wherein the endothermic agents contain any of aluminum hydroxide, zinc hydroxide, calcium sulfate, erythritol, xylitol, glucitol, and mannitol.

6. The battery pack according to claim 1, wherein an endothermic energy amount of each of the endothermic agents is 1 kJ/g to 10,000 kJ/g.

* * * * *